Figure 1:
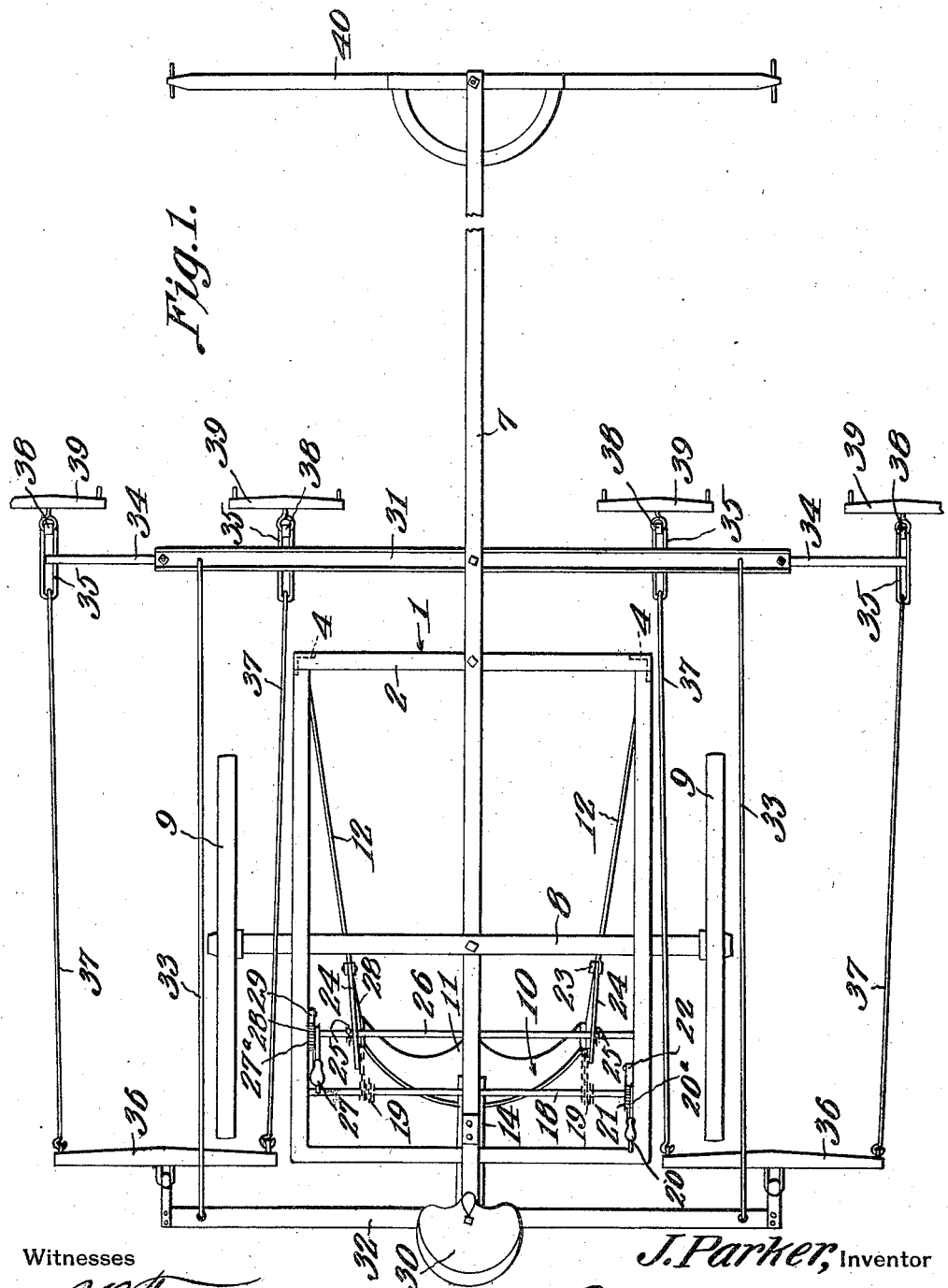

J. PARKER.
TREE DIGGER.
APPLICATION FILED OCT. 27, 1914.

1,182,032.

Patented May 9, 1916.
2 SHEETS—SHEET 1.

Witnesses

J. Parker, Inventor by C.A. Snow & Co.
Attorneys

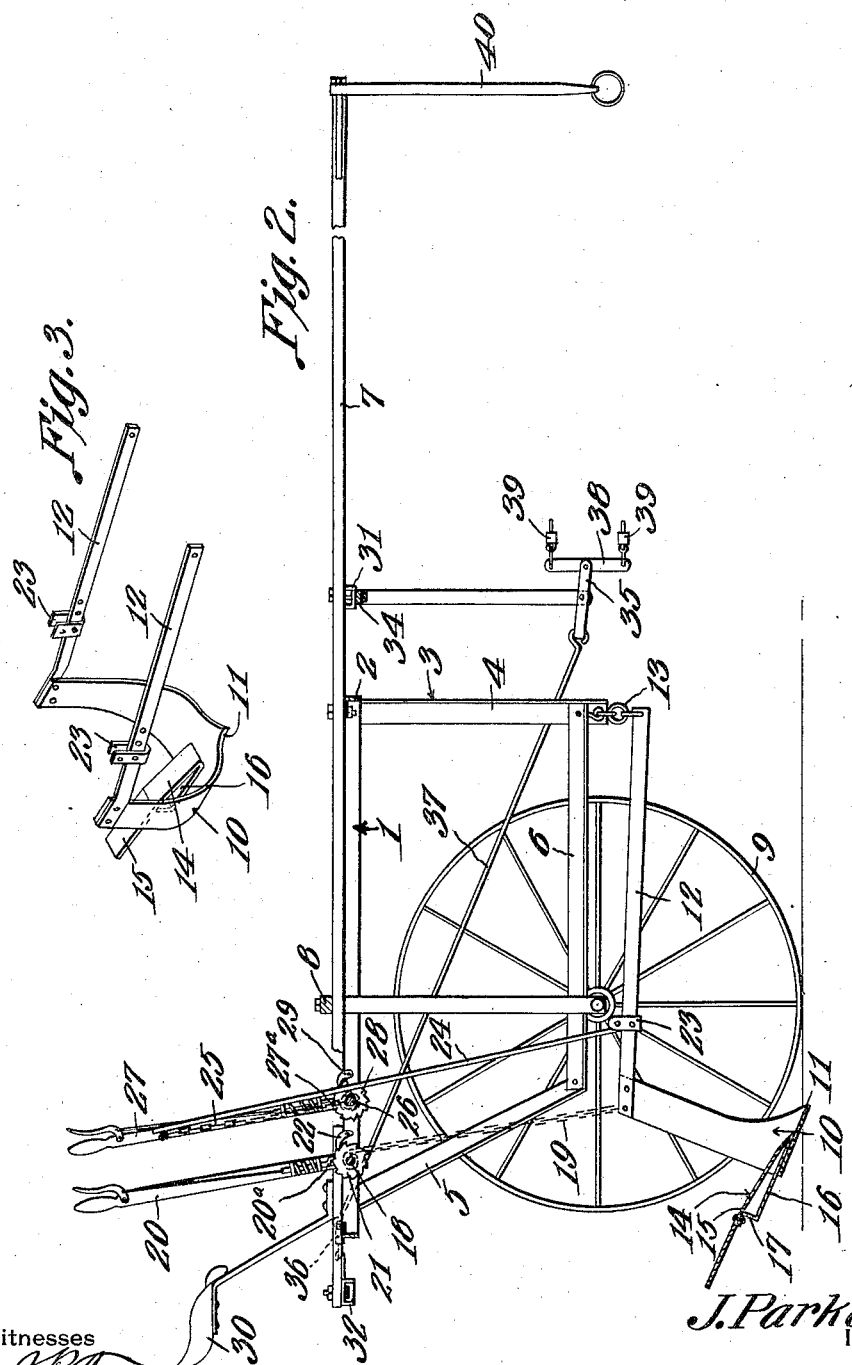

UNITED STATES PATENT OFFICE.

JIM PARKER, OF TECUMSEH, OKLAHOMA.

TREE-DIGGER.

1,182,032.  Specification of Letters Patent.  Patented May 9, 1916.

Application filed October 27, 1914. Serial No. 868,868.

*To all whom it may concern:*

Be it known that I, JIM PARKER, a citizen of the United States, residing at Tecumseh, in the county of Pottawatomie and State of Oklahoma, have invented a new and useful Tree-Digger, of which the following is a specification.

The present invention appertains to diggers and aims to provide a novel and improved apparatus for digging young or nursery trees or the like.

This invention comprehends the provision of a riding or wheel mounted digging apparatus of unique construction, embodying a novel shovel or digging blade and peculiar and effective means for depressing and elevating the same.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a plan view of the improved digger, parts being broken away. Fig. 2 is a longitudinal section of the structure. Fig. 3 is a perspective view of the shovel or digging blade and its beams.

In carrying out the present invention, there is provided a sulky or wheel mounted frame or body 1, which includes the upper rectangular section 2 and the side sections 3 attached thereto, and including the front and rear upright portions 4 and 5, respectively, and the longitudinal bars or members 6 connecting the lower ends of the portions 4 and 5. The frame 1 is thus of inverted U-shape or is arched transversely.

A longitudinal tongue or pole 7 is bolted or otherwise secured upon the ends of the top section 2 of the frame 1 intermediate the side sections 3 of the frame and an arched axle 8 has its upright portions secured within the side sections 3 of the frame 1, while the intermediate or crest portion of the axle 8 projects upwardly through the top section 2 and passes over the tongue or pole 7. The intermediate or crest portion of the axle 8 is secured upon the tongue or pole 7, while the spindles of the axle project outwardly below the lower bars or members 6 of the side sections 3, and have the ground wheels 9 journaled thereon at the sides of the frame 1. The axle 8 is disposed intermediate the ends of the frame 1 to balance the machine.

The shovel or digging blade 10 is bent from a plate of suitable sheet metal, and is of U-shape, the intermediate or bent portion of the shovel or blade 10 being relatively wide and its arms tapering to their ends. The forward edge of the shovel or blade 10 is sharpened, and is provided with a forwardly projecting point or nose 11 at the lowermost or yoke portion of the blade. The shovel or digging blade 10 is carried by a pair of forwardly projecting and diverging beams 12 which have their rear ends securely riveted or otherwise attached to the upper ends of the shovel 10, while the forward ends of the beams 12 are loosely connected to the lower protruding ends of the standards or uprights 4 of the frame 1, by means of short chains or links 13. The beams 12 are arranged at obtuse angles with the upper ends of the shovel 10, as clearly seen in Fig. 2, whereby the intermediate or lower portion of the shovel will be arranged at an acute angle with respect to the beams 12. The beams 12 lie below the frame 1 and the axle 8, whereby the shovel will be carried below the rear portion of the frame, the beams 12 and the shovel 10 trailing from the forward end portion of the frame, as will be apparent.

The intermediate or central portion of shovel 10 carries an elevator or deflector 14 which is bent or formed from a strip or elongated plate 15, the strip or plate 15 being inclined and having its lower or forward portion bent back as at 16, and riveted or otherwise secured upon the intermediate portion of the shovel 10, whereby the body of the strip or plate 15 is inclined from the intermediate portion of the shovel. The rear end of the portion 16 is bent upwardly and riveted to the body portion of the strip or plate 15, as indicated at 17, so as to brace the elevator or deflector structure.

As a means for elevating the shovel 10, and for limiting the downward movement thereof, there is provided a transverse shaft 18 terminally journaled to the sides of the top section 2 of the frame adjacent the rear end of the frame, and chains or other flexible elements 19 are attached to the points of juncture of the beams 12 and the shovel 10 and are secured to the shaft 18 to be wound thereon. A suitable hand lever 20 is fulcrumed loosely upon the shaft 18 adjacent the right hand side of the frame 1, and carries a lower spring pressed pawl or dog 20ª engageable with a ratchet wheel 21 keyed or otherwise secured upon the shaft 18, and a pawl or dog 22 is carried by the right hand side of the frame to engage the ratchet wheel 21 for normally preventing the retrograde or reverse rotation of the said shaft.

The mechanism for depressing the shovel 10 and maintaining the same in depressed position, embodies a pair of U-shaped clips 23 straddling the beams 12 from below and adjustably secured to the said beams adjacent their rear ends or the shovel 10, and a pair of thrust rods 24 have their lower ends pivoted between the ends of the respective clips 23 and have chains or flexible elements 25 detachably connected to their upper ends. The lower ends of the chains 25 are secured to and adapted to be wound upon a transverse winding shaft 26 terminally journaled to the sides of the top sections 2 of the frame immediately in advance of the shaft 18. The thrust rods 24 project above and are adapted to rest rearwardly against the shaft 26, in order that when the chains 25 are wound upon the shaft 26, the thrust rods 24 will be forcibly depressed to swing the beams 12 downwardly. The shaft 26 may be conveniently rotated through the medium of a suitable hand lever 27 loosely fulcrumed upon the shaft 26 adjacent the left hand side of the frame 1, and carrying a spring pressed pawl or dog 27ª engageable with the ratchet wheel 28 secured upon the shaft 26. A pawl or dog 29 is carried by the left hand side of the frame 1 for engaging the ratchet wheel 28 to prevent the reverse rotation of the shaft 26 under normal conditions.

The operator's seat 30 is carried by the rear end of the frame 1 and lies between the right and left hand levers 20 and 27 which may be readily manipulated by the operator, and which afford considerable purchase in rotating the shafts 18 and 26, respectively.

The machine is adapted to be drawn over the ground by a plurality of horses, mules or other draft animals, and to this end, a peculiar draft equalizer is provided for a team of four draft animals walking abreast. The draft equalizer includes a forward transverse evener bar or lever 31 fulcrumed intermediate its ends to the tongue 7 adjacent the forward end of the frame 1, and a rear transverse evener bar or lever 32 is fulcrumed intermediate its ends to the rear end of the tongue 7 adjacent the rear end of the frame 1, the arms of the evener bars or levers 32 being connected at the sides of the frame 1 by means of links 33 to constrain the evener bars or levers to swing simultaneously.

A pair of yokes 34 have their intermediate or crest portions fulcrumed to the ends of the forward evener bar or lever 31 and looped levers 35 are pivoted to the lower ends of the arches or yokes 34. A pair of levers 36 are fulcrumed or loosely connected intermediate their ends to the ends of the rear evener bar or lever 32, and the arms of the levers 36 at the opposite sides of the machine are connected to the rear ends of the two pairs of levers 35, by means of draft rods or links 37. Upright levers 38 are fulcrumed intermediate their ends to the forward ends of the levers 35, and a pair of upper and lower swingletrees 39 are loosely connected to each of the levers 38 for the connection of the traces or tugs. A suitable neck yoke 40 is attached to the forward or free end of the tongue 7.

The swingletrees 39 of each set being connected to the opposite ends of the arch or yoke 34 cause the draft to be equalized or distributed evenly between the draft animals of the respective pairs, it being observed that the forward flexing of the yokes or arches is resisted by the rearwardly inclined draft rods 37 which are connected to the lower ends of the arches or yokes 34 and which have their rear or upper ends connected to the levers 36. Thus, the arches or yokes 34 and the levers 36 will oscillate simultaneously at the opposite sides of the machine, the evener bars or levers 31 and 32 in oscillating, will properly distribute the draft between the two sets of draft animals at the opposite sides of the tongue 7. The draft equalizer thus enables the four draft animals to properly draw the machine over the ground, and the draft will be uniformly distributed to the several draft animals, as is desirable.

In operation, when the machine is being drawn over the soil and the frame 1 running astride a row of young trees, the shovel or digging blade 10 may be forcibly depressed into the soil to loosen the trees or plants and lift them up by their roots. To depress the shovel, the thrust rods 24 are pressed downwardly and the upper or free ends of the chains 25 are engaged to the upper ends of the rods 24, in which event the winding shaft 26 is rotated in the proper direction by oscillating the hand lever 27, so as to wind the chains 25 upon the shaft 26 to forcibly depress the beams 12 and to hold the said beams in a lowered position. The inclination of the intermediate portion of the shovel with respect to the beams 12, will give the shovel a natural tendency to work its way into the soil below the surface thereof, so that the shovel may be conveniently depressed, especially due to the fact that the hand lever 27 being operatively connected to the shaft 26 through the pawl and ratchet device, will afford a considerable purchase for depressing the beams 12. The forward edge of the shovel 10 being sharpened, will enable the shovel to cut its way through the soil in a convenient and ready manner, the point or nose 11 of the shovel projecting foremost and greatly facilitating the advance of the shovel in the soil under the plants or trees. The intermediate portion of the shovel will cut under the plants, while the sides or arms of the shovel will loosen or sever the soil at the sides of the row of plants being dug. The elevator or deflector 14 which is inclined upwardly from the intermediate portion of the shovel will raise the plants to the surface of the soil, in order that the plants may be raised bodily by the roots onto the surface of the soil from which they may be readily gathered. To raise the shovel out of the soil, as when the machine is running idle, or when the machine is turned around at the ends of the rows, the pawl or dog 29 which holds the shaft 26 against reversed rotation, is released from the ratchet wheel 28, and the hand lever 20 is then oscillated to wind the chains 19 upon the winding shaft 18, which will raise the rear ends of the beams 12 to elevate the shovel blade above the surface of the soil. The pawl or dog 22 engaging the ratchet wheel 21 of the shaft 18 will hold the shaft 18 against retrograde movement, to prevent the chains 19 from unwinding, until the pawl or dog 22 is released for enabling the shovel to be depressed by the actuating hand lever 27 as above intimated.

With the present apparatus, it is an easy matter for the operator to depress and elevate the shovel, as desired, and in this manner, the labor of digging the trees or other plants is reduced to a minimum. The other advantages and capabilities of the present device will be obvious to those skilled in the art, without further comment being necessary.

Having thus described the invention, what is claimed as new is:—

In a device of the character described, a riding frame, a pair of beams loosely connected thereto, a U-shaped shovel terminally secured to the said beams, and a deflector including an inclined plate having its lower end portion bent back and secured upon the intermediate portion of the shovel, the said bent back portion having a portion bent toward and secured to the body of the said plate.

In testimony that I claim the foregoing as my own, I have hereto affixed my signature in the presence of two witnesses.

JIM PARKER.

Witnesses:
ROBT. WARREN,
ROY MYERS.

Copies of this patent may be obtained for five cents each, by addressing the "Commissioner of Patents, Washington, D. C."